US009205671B1

(12) United States Patent
Simmons et al.

(10) Patent No.: US 9,205,671 B1
(45) Date of Patent: *Dec. 8, 2015

(54) PRINTER FOR A MOBILE DEVICE

(71) Applicant: Marvell International Ltd., Hamilton (BM)

(72) Inventors: Asher Simmons, Corvallis, OR (US); Patrick A. McKinley, Corvallis, OR (US); Paramesh Gopi, Cupertino, CA (US); James D. Bledsoe, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,343

(22) Filed: Jan. 20, 2014

Related U.S. Application Data

(63) Continuation of application No. 11/955,258, filed on Dec. 12, 2007, now Pat. No. 8,632,266.

(60) Provisional application No. 60/883,216, filed on Jan. 3, 2007, provisional application No. 60/892,688, filed on Mar. 2, 2007, provisional application No. 60/892,707, filed on Mar. 2, 2007.

(51) Int. Cl.
*B41J 3/28* (2006.01)
*B41J 3/36* (2006.01)
(Continued)

(52) U.S. Cl.
CPC .... *B41J 3/28* (2013.01); *B41J 3/36* (2013.01); *B41J 29/38* (2013.01); *G06F 3/1292* (2013.01); *H04N 1/047* (2013.01); *H04N 1/107* (2013.01); *H04N 2201/0082* (2013.01); *H04N 2201/04713* (2013.01); *H04N 2201/04794* (2013.01)

(58) Field of Classification Search
CPC ..................................... B41J 3/28; B41J 3/36
See application file for complete search history.

(56) References Cited

U.S. PATENT DOCUMENTS 3,359,425 A 12/1967 Smith
5,278,582 A 1/1994 Hongo
(Continued)

FOREIGN PATENT DOCUMENTS

AU 2006252324 B1 1/2007
EP 0655706 A1 5/1995
(Continued)

OTHER PUBLICATIONS

U.S. Appl. No. 11/959,027, filed Dec. 18, 2007, Simmons et al., "Ergonomic Design for a Handheld Image Translation Device," 25 pages.
(Continued)

*Primary Examiner* — Daniel J Colilla

(57) ABSTRACT

Systems, apparatuses, and methods for a printing device for use with a mobile device are described herein. The printing device may include an image capture module to capture surface images of a medium and a positioning module to determine positioning information based at least in part on navigational measurements and the captured surface images. A print module of the printing device may cause print forming substances to be deposited based at least in part on the positioning information. A mobile device may include one or more features of the printing device including the image capture module, the positioning module, and the print module. Other embodiments may be described and claimed.

16 Claims, 8 Drawing Sheets

(51) Int. Cl.
*B41J 29/38* (2006.01)
*G06F 3/12* (2006.01)
*H04N 1/047* (2006.01)
*H04N 1/107* (2006.01)

(56) References Cited

U.S. PATENT DOCUMENTS

| | | | |
|---|---|---|---|
| 5,387,976 A | 2/1995 | Lesniak |
| 5,446,559 A | 8/1995 | Birk |
| 5,461,680 A | 10/1995 | Davis |
| 5,578,813 A | 11/1996 | Allen et al. |
| 5,927,872 A | 7/1999 | Yamada |
| 5,930,466 A | 7/1999 | Rademacher |
| 5,988,900 A | 11/1999 | Bobry |
| 6,209,996 B1 | 4/2001 | Gasvoda et al. |
| 6,259,826 B1 | 7/2001 | Pollard et al. |
| 6,326,950 B1 | 12/2001 | Liu |
| 6,348,978 B1 | 2/2002 | Blumer et al. |
| 6,357,939 B1 | 3/2002 | Baron |
| 6,360,656 B2 | 3/2002 | Kubo et al. |
| 6,384,921 B1 | 5/2002 | Saijo et al. |
| 6,846,119 B2 | 1/2005 | Walling |
| 6,952,880 B2 | 10/2005 | Saksa |
| 7,038,712 B1 | 5/2006 | Livingston et al. |
| 7,200,560 B2 | 4/2007 | Philbert |
| 7,246,958 B2 | 7/2007 | Saund et al. |
| 7,297,912 B1 | 11/2007 | Todoroff et al. |
| 7,336,388 B2 | 2/2008 | Breton |
| 7,410,100 B2 | 8/2008 | Muramatsu |
| 7,470,021 B2 | 12/2008 | Silverbrook |
| 7,591,166 B2 | 9/2009 | Ueda et al. |
| 7,607,749 B2 | 10/2009 | Tabata et al. |
| 7,748,839 B2 | 7/2010 | Noe et al. |
| 7,787,145 B2 | 8/2010 | Robertson et al. |
| 7,845,748 B2 | 12/2010 | Mealy et al. |
| 7,929,019 B2 | 4/2011 | Ohmura et al. |
| 7,949,370 B1 | 5/2011 | Bledsoe et al. |
| 7,988,251 B2 | 8/2011 | Dimitrijevic et al. |
| 8,000,740 B1 | 8/2011 | Bledsoe et al. |
| 8,077,343 B1 | 12/2011 | Simmons et al. |
| 8,107,108 B1 | 1/2012 | McKinley et al. |
| 8,223,384 B1 | 7/2012 | Bledsoe et al. |
| 8,226,194 B1 | 7/2012 | Bledsoe et al. |
| 8,240,801 B2 | 8/2012 | Bledsoe et al. |
| 8,339,675 B2 | 12/2012 | Mealy et al. |
| 8,342,627 B1 | 1/2013 | Bledsoe et al. |
| 8,351,062 B2 | 1/2013 | Bledsoe et al. |
| 8,396,654 B1 | 3/2013 | Simmons et al. |
| 8,472,066 B1 | 6/2013 | Simmons et al. |
| 2001/0019340 A1 | 9/2001 | Kubo et al. |
| 2002/0154186 A1 | 10/2002 | Matsumoto |
| 2002/0158955 A1 | 10/2002 | Hess et al. |
| 2003/0035039 A1 | 2/2003 | Kanome et al. |
| 2003/0150917 A1 | 8/2003 | Tsikos et al. |
| 2004/0021912 A1 | 2/2004 | Tecu et al. |
| 2004/0027443 A1 | 2/2004 | Trent |
| 2004/0109034 A1 | 6/2004 | Brouhon |
| 2004/0183913 A1 | 9/2004 | Russell |
| 2004/0208346 A1 | 10/2004 | Baharav et al. |
| 2005/0001867 A1 | 1/2005 | Akase |
| 2005/0062721 A1 | 3/2005 | Hsu et al. |
| 2005/0068300 A1 | 3/2005 | Wang et al. |
| 2006/0012660 A1 | 1/2006 | Dagborn |
| 2006/0061647 A1 | 3/2006 | Breton |
| 2006/0165460 A1 | 7/2006 | Breton |
| 2007/0009277 A1 | 1/2007 | Shoen |
| 2007/0076082 A1 | 4/2007 | Cook |
| 2007/0120937 A1 | 5/2007 | Ahne et al. |
| 2007/0139507 A1 | 6/2007 | Ahne et al. |
| 2007/0139508 A1 | 6/2007 | Muyskens |
| 2007/0150194 A1 | 6/2007 | Chirikov |
| 2007/0237560 A1* | 10/2007 | Brown et al. ............ 400/88 |
| 2008/0007762 A1 | 1/2008 | Robertson et al. |
| 2008/0144053 A1 | 6/2008 | Gudan et al. |
| 2008/0204770 A1 | 8/2008 | Bledsoe et al. |
| 2008/0212120 A1 | 9/2008 | Mealy et al. |
| 2009/0034018 A1 | 2/2009 | Lapstun et al. |
| 2009/0141112 A1 | 6/2009 | Bergman et al. |
| 2009/0279148 A1 | 11/2009 | Lapstun et al. |
| 2010/0039669 A1 | 2/2010 | Chang et al. |
| 2010/0231633 A1 | 9/2010 | Lapstun et al. |

FOREIGN PATENT DOCUMENTS

| | | |
|---|---|---|
| EP | 1209574 A2 | 5/2002 |
| EP | 1227432 A1 | 7/2002 |
| JP | 08142584 A | 6/1996 |
| JP | 09300712 A | 11/1997 |
| JP | 11069100 A | 3/1999 |
| JP | 2002205387 A | 7/2002 |
| JP | 2002307756 A | 10/2002 |
| JP | 2004106339 A | 4/2004 |
| JP | 2006341604 A | 12/2006 |
| WO | WO03/076196 A1 | 9/2003 |
| WO | WO2004088576 A1 | 10/2004 |
| WO | WO2005070684 A1 | 8/2005 |

OTHER PUBLICATIONS

U.S. Appl. No. 12/037,045, filed Feb. 25, 2008, Seubert, "Active Immunization to Generate Antibodies to Soluable A-Beta," 45 pages.
U.S. Appl. 12/041,515, filed Mar. 3, 2008, Mealy et al., "Position Correction in Handheld Translation Device," 42 pages.
U.S. Appl. No. 12/062,472, filed Apr. 3, 2008, McKinley et al., "Image Translation Device Providing Navigational Data Feedback to communication Device," 39 pages.
U.S. Appl. No. 12/188,056, filed Aug. 7, 2008, Mealy et al., "Controlling a Plurality of Nozzles of a Handheld Printer," 47 pages.
Drzymala et al., "A Feasibilty Study Using a Stereo-optical Camera System to Verify Gamma Knife Treatment Specifications", Proceedings of the 22nd annual EMBS International Conference, Jul. 23-28, 2000, Chicago, IL, 4 pages.
Fairchild, "IEEE 1284 Interface Design Solutions", Jul. 1999, Fairchild Semiconductor, AN-5010, 10 pages.
Liu, "Determiantion of the Point of Fixation in a Head-Fixed Coordinate System", 1998 Proceedings. Fourteenth International Conference on Pattern Recognition; vol. 1; Digital Object Identifier, Published 1998, 4 pages.
PCT International Search Report and Written Opinion dated Jul. 1, 2008, in International Application No. PCT/US2007/026067, 12 pages.
Texas Instruments, "Program and Data Memory Controller", Sep. 2004, SPRU577A, 115 pages.

* cited by examiner

PRINTER FOR A MOBILE DEVICE

CROSS-REFERENCE TO RELATED APPLICATIONS

This present application is a continuation of and claims priority to U.S. patent application Ser. No. 11/955,258 filed Dec. 12, 2007, now U.S. Pat. No. 8,632,266, issued on Jan. 21, 2014, which claims the benefit of provisional application 60/883,216 filed on Jan. 3, 2007, provisional application 60/892,688, filed on Mar. 2, 2007, and provisional application 60/892,707, filed on Mar. 2, 2007, which are herein incorporated by reference.

TECHNICAL FIELD

Embodiments of the present invention relate to the field of image translation and, in particular, to a printing device for use with mobile devices.

BACKGROUND

Mobile telephones have achieved tremendous popularity among consumers. Many, if not most, consumers own at least one mobile telephone, some of those consumers replacing the traditional landline completely therewith. As such, improvements in capability and functionality of these devices have been met with eager approval. For example, these devices commonly include the most advanced display and image processing technologies as well as text messaging and photographing capabilities. Transforming digital images captured by these devices into a hard-copy format, however, generally has not been available to the consumer in a manner that matches the mobility of these devices. Current desktop printing solutions may be impractical or undesirable options for those consumers who want high-quality printing on the fly.

Traditional printing devices rely on a mechanically operated carriage to transport a print head in a linear direction as other mechanics advance a medium in an orthogonal direction. As the print head moves over the medium an image may be laid down. Portable printers have been developed through technologies that reduce the size of the operating mechanics. However, the principles of providing relative movement between the print head and medium remain the same as traditional printing devices. Accordingly, these mechanics limit the reduction of size of the printer as well as the material that may be used as the medium.

Handheld printing devices have been developed that ostensibly allow an operator to manipulate a handheld device over a medium in order to print an image onto the medium. However, these devices are challenged by the unpredictable and nonlinear movement of the device by the operator. The variations of operator movement make it difficult to determine the precise location of the print head. This type of positioning error may have deleterious effects of the quality of the printed image. This is especially the case for relatively large print jobs, as the positioning error may accumulate in a compounded manner over the entire print operation.

SUMMARY

In view of the challenges in the state of the art, at least some embodiments of the present invention are based on the technical problem of providing a printing apparatus for use with a mobile device that may accurately determine position of the printing apparatus and/or the mobile device over an entire print operation. More specifically, there is provided, in accordance with various embodiments of the present invention, a printing apparatus including a communication interface configured to receive image data from a mobile device; one or more navigation sensors configured to capture first navigational measurements of a first portion of a medium; one or more optical imaging sensors configured to capture a first plurality of surface images of the first portion of the medium; a control block configured to determine a position of the apparatus relative to a first reference point based at least in part on the first navigational measurements and the first plurality of surface images; and a print head configured to deposit a printing substance on the medium based at least in part on the image data and the determined position of the apparatus.

In some embodiments, the control block may include a positioning module configured to control the one or more navigation sensors and to determine the position of the apparatus relative to the first reference point based at least in part on the first navigational measurements.

In some embodiments, the control block may be configured to control the one or more navigation sensors to capture second navigational measurements of a second portion of the medium and to determine a plurality of positions of the apparatus relative to a second reference point based at least in part on the second navigational measurements.

In some embodiments, the control block may be configured to control the one or more optical imaging sensors to selectively capture a second plurality of surface images of the second portion of the medium and to construct a composite image based at least in part on the determined plurality of positions of the apparatus and the second plurality of surface images.

In some embodiments, the apparatus may include a print module configured to cause the printing substance to be deposited on the first portion of the medium based at least in part on the image data and the determined position of the apparatus.

In some embodiments, the apparatus may include an image capture module configured to control the one or more optical imaging sensors to capture the first plurality of surface images of the medium.

In some embodiments, the apparatus may include an image processing module configured to process the image data in a manner to facilitate depositing of the printing substance.

In some embodiments, the print head may include a plurality of nozzles.

In some embodiments, the communication interface may comprise a wireless communication interface. In various embodiments, the apparatus may be configured to couple to the mobile device.

There is also provided, in accordance with various embodiments of the present invention, a mobile device including a communication interface configured receive image data from and provide image data to a printing apparatus; an image capture module configured to control one or more optical imaging sensors to capture a first plurality of surface images of a medium; a positioning module configured to control one or more navigation sensors to capture first navigational measurements of the first portion of the medium and to determine a position of the printing apparatus relative to a first reference point based at least in part on the first navigational measurements and the first plurality of surface images; and a print module configured to cause a printing substance to be deposited on the first portion of the medium based at least in part on the first navigational measurements and the image data.

In some embodiments, the positioning module is further configured to control the one or more navigation sensors to capture second navigational measurements of a second portion of the medium and to determine a plurality of positions of the printing apparatus relative to a second reference point based at least in part on the second navigational measurements.

In some embodiments, the positioning module is further configured to control the one or more optical imaging sensors to selectively capture a second plurality of surface images of the second portion of the medium and to construct the composite image based at least in part on the determined plurality of positions of the printing apparatus and the second plurality of surface images.

In some embodiments, the mobile device may include an image processing module configured to process the image data in a manner to facilitate depositing of the printing substance.

In some embodiments, the communication interface may comprise a wireless communication interface. In various embodiments, the mobile device may be configured to couple to the printing apparatus.

A method is also provided in accordance with various embodiments. The method may include receiving image data from a mobile device; controlling one or more navigation sensors to capture first navigational measurements of a first portion of a medium; controlling one or more optical image sensors to capture a first plurality of surface images of the first portion of the medium; determining a position of a printing apparatus relative to a first reference point based at least in part on the first navigational measurements and the first plurality of surface images; and controlling a print head to deposit a printing substance on the medium based at least in part on the image data and the determined position of the printing apparatus.

In some embodiments, the method may include controlling the one or more navigation sensors to capture second navigational measurements of a second portion of the medium; determining a plurality of positions of the printing apparatus relative to a second reference point based at least in part on the second navigational measurements; controlling the one or more optical image sensors to capture a second plurality of surface images of the second portion of the medium; and constructing a composite image based at least in part on the determined plurality of positions and the second plurality of surface images. In some embodiments, determining the position of the printing apparatus may be further based at least in part on the composite image.

In some embodiments, the method may include processing the received image data in a manner to facilitate the controlling of the print head to deposit the printing substance.

Other features that are considered as characteristic for embodiments of the present invention are set forth in the appended claims.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Mobile devices as described herein may include various handheld devices and the like. For example, a mobile device may include, but is not limited to, a mobile telephone, a personal digital assistant, or a smartphone. Although embodiments described herein may particularly refer to a mobile telephone, it is contemplated that embodiments of the present disclosure may be equally applicable to other mobile devices.

Figure 1:
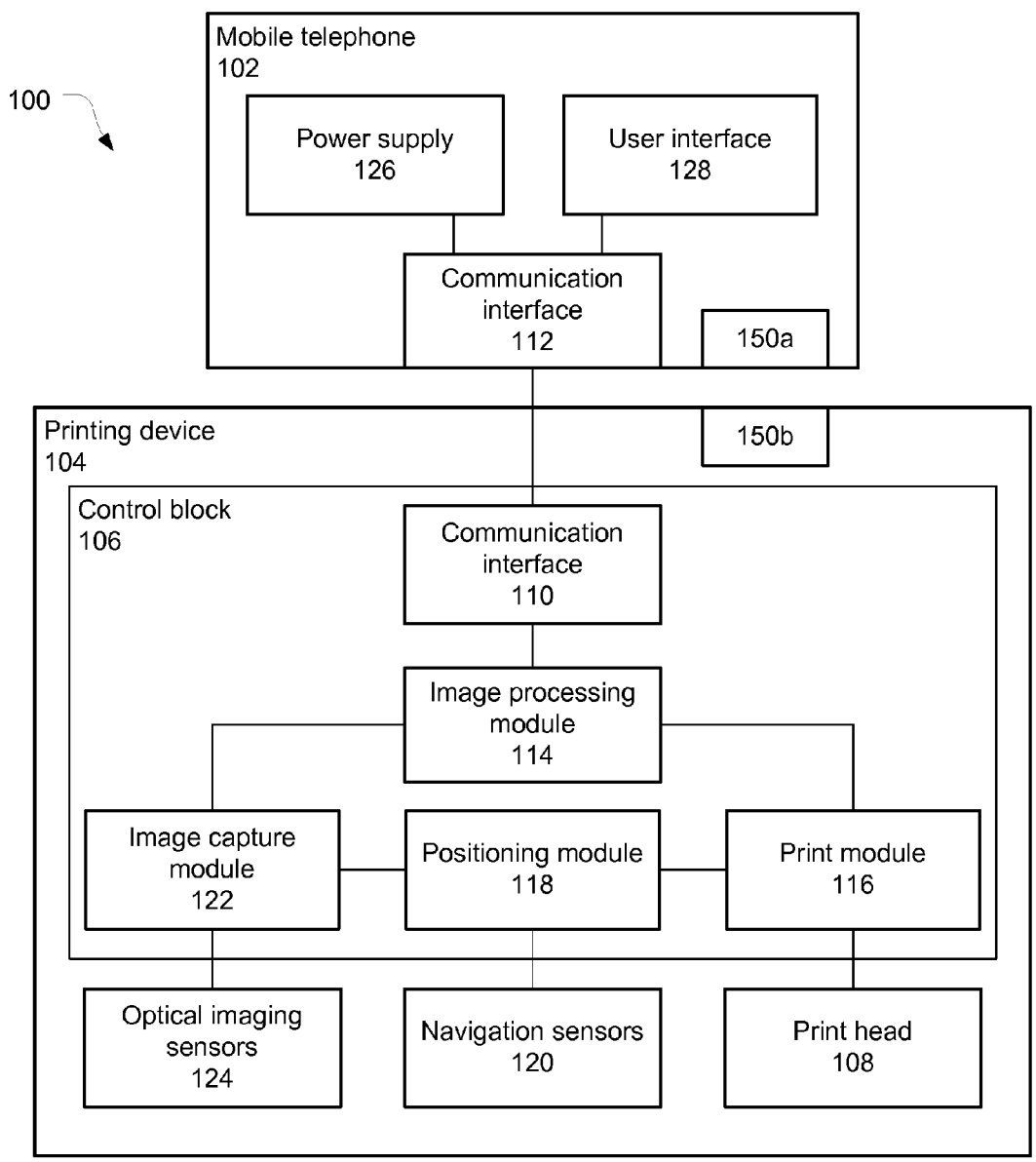
FIG. 1 is a schematic of a system including a mobile telephone and a printing device in accordance with various embodiments of the present invention.

FIG. 1 is a schematic of a system 100 including a mobile device such as, for example, a mobile telephone 102 and a printing device 104, hereinafter printing device 104, in accordance with various embodiments of the present invention. The printing device 104 may include a control block 106 with components designed to control one or more navigation sensors 120 in a manner to facilitate precise and accurate determination of the position of a print head 108 throughout an entire printing operation. This positioning may allow for reliable image production, through printing in a truly mobile and versatile platform as will be explained herein.

The control block 106 may include a communication interface 110 configured to communicatively couple the control block 106 to a communication interface 112 of the mobile telephone 102. The mobile telephone 102 may be configured to transmit data related to an image to be printed. Such images may include images either captured by a camera device of the mobile telephone 102 or otherwise transmitted to the mobile telephone 102. Similarly, images may include an image of a text or an e-mail message, a document, or other images.

The communication interface 110 may include a wireless transceiver to allow the communicative coupling with the mobile telephone 102 to take place over a wireless link. The image data may be wirelessly transmitted over the link through the modulation of electromagnetic waves with frequencies in the radio, infrared or microwave spectrums.

A wireless link may contribute to the mobility and versatility of the printing device 104. However, some embodiments may additionally/alternatively include a wired link communicatively coupling the mobile telephone 102 to the communication interface 110.

In some embodiments, the communication interface 110 may communicate with the mobile telephone 102 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

The communication interface 110 may transmit the image data to an on-board image processing module 114. As illustrated, the image processing module 114 is located on the printing device 104. In other embodiments, however, the image processing module 114, at least in part, may be located on the mobile telephone 102 and such a configuration may minimize the overall size and/or expense of the printing device 104.

The image processing module 114 may process the image data in a manner to facilitate an upcoming printing process. Image processing techniques may include dithering, decompression, half-toning, color plane separation, and/or image storage. In various embodiments some or all of these image processing operations may be performed by the mobile telephone 102 or another device. The processed image may then be transmitted to a print module 116 where it may be stored in anticipation of a print operation.

The print module 116 may also receive positioning information, indicative of a position of the print head 108 relative to a reference point, from a positioning module 118. The positioning module 118 may be communicatively coupled to one or more navigation sensors 120. The navigation sensors 120 may include a light source, e.g., LED, a laser, etc., and an optoelectronic sensor designed to take a series of pictures of a medium adjacent to the printing device 104 as the printing device 104 is moved over the medium. The positioning module 118 may process the pictures provided by the navigation sensors 120 to detect structural variations of the medium. The movement of the structural variations in successive pictures may indicate motion of the printing device 104 relative to the medium. Tracking this relative movement may facilitate determination of the precise positioning of the navigation sensors 120. The navigation sensors 120 may be maintained in a structurally rigid relationship with the print head 108, thereby allowing for the calculation of the precise location of the print head 108.

The medium, as used in embodiments herein, may be any type of medium on which a printing substance, e.g., ink, powder, etc., may be deposited. It is not limited to printed paper or other thin, flexible print media commonly associated with traditional printing devices.

The navigation sensors 120 may have operating characteristics sufficient to track movement of the printing device 104 with the desired degree of precision. In an exemplary embodiment, the navigation sensors 120 may process approximately 2000 frames per second, with each frame including a rectangular array of 18×18 pixels. Each pixel may detect a six-bit grayscale value, e.g., capable of sensing 64 different levels of gray.

Once the print module 116 receives the positioning information it may coordinate the location of the print head 108 to a portion of the processed image with a corresponding location. The print module 116 may then control the print head 108 in a manner to deposit a printing substance on the medium to represent the corresponding portion of the processed image.

The print head 108 may be an inkjet print head having a plurality of nozzles designed to emit liquid ink droplets. The ink, which may be contained in reservoirs/cartridges, may be black and/or any of a number of various colors. A common, full-color inkjet print head may have nozzles for cyan, magenta, yellow, and black ink. Other embodiments may utilize other printing techniques, e.g., toner-based printers such as laser or light-emitting diode (LED) printers, solid ink printers, dye-sublimation printers, inkless printers, etc.

The control block 106 may also include an image capture module 122. The image capture module 122 may be communicatively coupled to one or more optical imaging sensors 124. The optical imaging sensors 124 may include a number of individual sensor elements. The optical imaging sensors 124 may be designed to capture a plurality of surface images of the medium, which may be individually referred to as component surface images. The image capture module 122 may generate a composite image by stitching together the component surface images. The image capture module 122 may receive positioning information from the positioning module 118 to facilitate the arrangement of the component surface images into the composite image.

According to various embodiments, the image capture module 122 may be utilized for calibrating the positioning module 118. In various embodiments, the component surface images (whether individually, some group, or collectively as the composite image) may be compared to the processed print image rendered by the image processing module 114 to correct for accumulated positioning errors and/or to reorient the positioning module 118 in the event the positioning module 118 loses track of its reference point. This may occur, for example, if the printing device 104 is removed from the medium during a print operation.

The printing device 104 may include its own dedicated power supply (not illustrated) and/or may receive power from a power supply 126 of the mobile telephone 102. The power supply of the printing device 104 and/or the power supply 126 of the mobile telephone 102 may be a mobile power supply, e.g., a battery, a rechargeable battery, a solar power source, etc. In other embodiments, the power supply of the printing device 104 and/or the power supply 126 of the mobile telephone 102 may additionally/alternatively regulate power provided by another component (e.g., another device, a power cord coupled to an alternating current (AC) outlet, etc.).

The mobile telephone 102 may include a user interface 128, as is generally present on known mobile telephones. The user interface 128 may include keys or similar features for inputting numbers and/or letters, adjusting volume and screen brightness, etc. Advantageously, the user interface 128 may also be configured to control one or more aspects of a printing operation by the printing device 104. For example, the user interface 128 may allow a user to select an image, the data for which is to be used for the printing operation, and to send the image data to the image processing module 114. The user interface 128 may be used to start and/or stop the printing operation, repeat the printing operation, adjust the printing operation, etc. The user interface 128 may also be used to adjust the image being printed in terms of scale, color, special effects, etc., for example. In other embodiments, however, the printing device 104 may include its own dedicated user interface (not illustrated).

Figure 2:
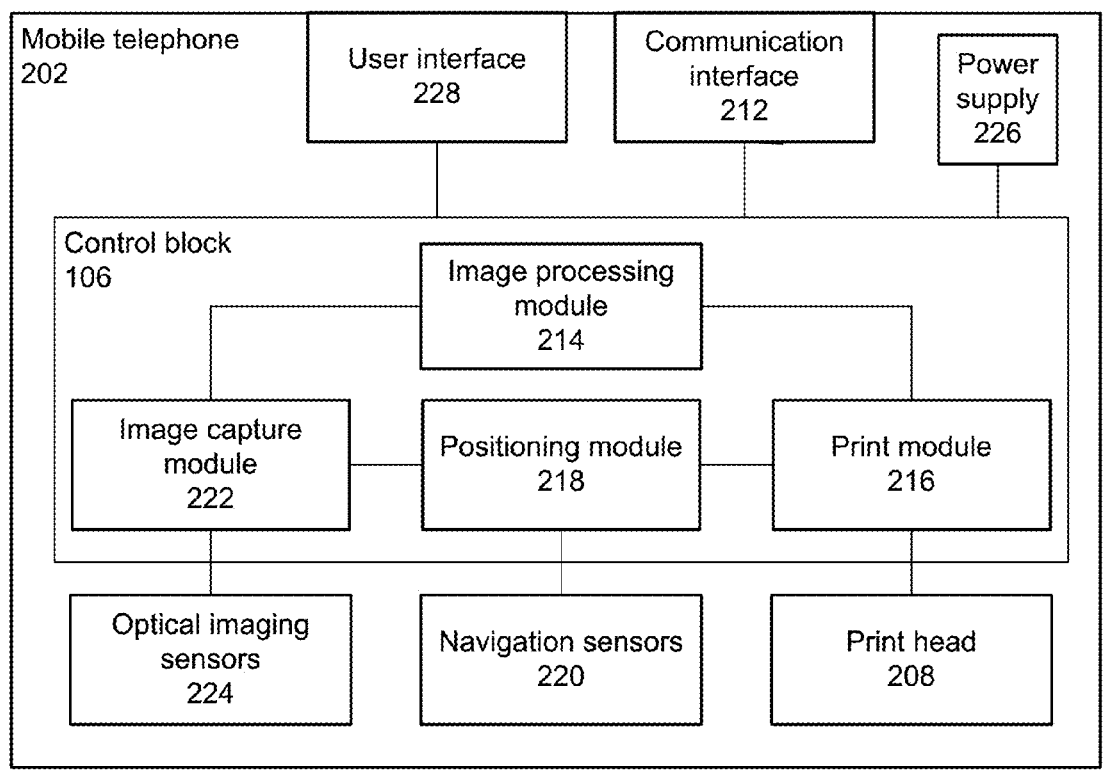
FIG. 2 is a schematic of another system including a mobile telephone and a printing device in accordance with various embodiments of the present invention.

The mobile telephone 102 and the printing device 104 may be physically coupled, at least temporarily. In these embodiments, the housings of the mobile telephone 102 and the printing device 104 may be configured to interlock or snap together such that a user may attach the printing device 104 to the mobile telephone when a printing operation is desired yet decouple them when not needed. For example, FIG. 1 illustrates a mechanical arrangement 150a within the mobile telephone 102 and a mechanical arrangement 150b within the printing device 104. The mechanical arrangements 150a and 150b are configured to, for example, interlock or snap together the housings of the mobile telephone 102 and the printing device 104, so that the user may attach the printing device 104 to the mobile telephone when a printing operation is desired yet decouple them when not needed. For example, the communication interface 112 of the printing device 104 may comprise a port to receive the mobile telephone 102. In other embodiments, however, the printing device 104 and the mobile telephone 102 may be fully integrated. As illustrated in FIG. 2, for example, a mobile telephone 202 may include a user interface 228, a communication interface 212, a control block 206, a power supply 226, one or more print heads 208, one or more optical imaging sensors 224, and one or more navigation sensors 220. The control block 206 may include an image processing module 214, an image capture module 222, a positioning module 218, and a print module 216.

Figure 3:
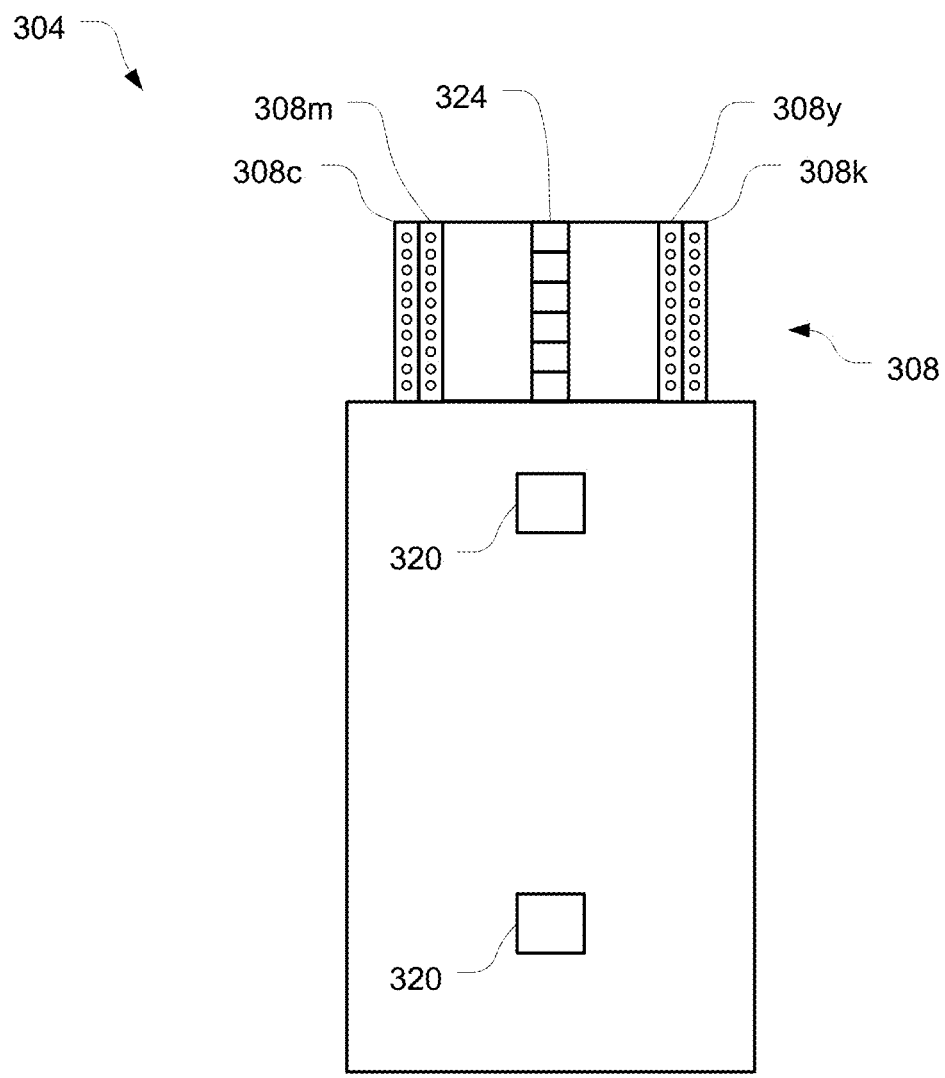
FIGS. 3 and 3A are bottom plan views of a printing device in accordance with various embodiments of the present invention.

FIG. 3 is a bottom plan view of a printing device 304 in accordance with various embodiments of the present invention. The printing device 304, which may be substantially interchangeable with the printing device 104, may have a pair of navigation sensors 320, optical imaging sensors 324, and a print head 308.

The pair of navigation sensors 320 may be used by a positioning module to determine positioning information related to the optical imaging sensors 324 and/or the print head 308. As stated above, the proximal relationship of the optical imaging sensors 324 and/or print head 308 to the navigation sensors 320 may be fixed to facilitate the positioning of the optical imaging sensors 324 and/or print head 308 through information obtained by the navigation sensors 320.

Figure 3A:
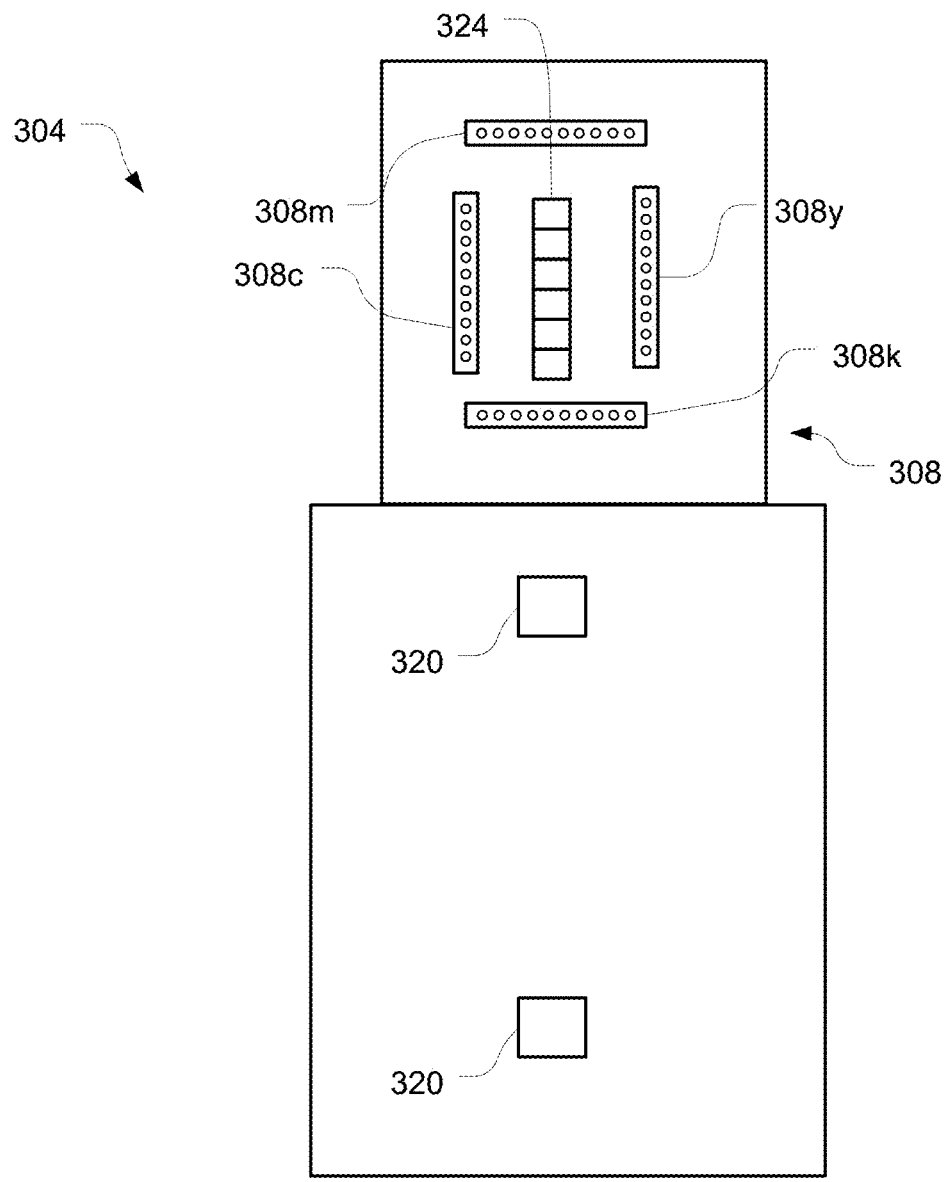

The print head 308 may be an inkjet print head having a number of nozzle rows for different colored inks. In particular, and as shown in FIG. 3, the print head 308 may have a nozzle row 308c for cyan-colored ink, a nozzle row 308m for magenta-colored ink, a nozzle row 308y for yellow-colored ink, and nozzle row 308k for black-colored ink. The nozzle rows of the print head 308 may be arranged around the optical imaging sensors 324. This may allow for the optical imaging sensors 324 to capture information about the ink deposited on the medium, which represents the processed image in various formative stages, for the predominant side-to-side motion of the printing device 304. For example, FIG. 3A illustrates the nozzle rows (e.g., nozzle row 308c, nozzle row 308m, nozzle row 308y and nozzle row 308k) of the print head 308 arranged around the optical imaging sensors 324. The arrangement on the nozzle rows around the optical imaging sensors 324, as illustrated in FIG. 3A, is only an example, and in other embodiments, the nozzle rows may be arranged in any other appropriate manner.

In various embodiments the placement of the nozzles of the print head 308 and the sensor elements of the optical imaging sensors 324 may be further configured to account for the unpredictable nature of movement of the printing device 304. For example, while the nozzles and sensor elements are arranged in linear arrays in the printing device 104 other embodiments may arrange the nozzles and/or sensor elements in other patterns. In some embodiments the nozzles may be arranged completely around the sensor elements so that whichever way the printing device 104 is moved the optical imaging sensors 324 will capture component images reflecting deposited ink. In some embodiments, the nozzles may be arranged in rings around the sensor elements (e.g., concentric circles, nested rectangular patterns, etc.).

While the nozzle rows 308c, 308m, 308y, and 308k shown in FIG. 3 are arranged in rows according to their color, other embodiments may intermix the different colored nozzles in a manner that may increase the chances that an adequate amount of appropriate colored ink is deposited on the medium through the natural course of movement of the printing device 304 over the medium.

In the embodiment depicted by FIG. 3, the linear dimension of the optical imaging sensors 324 may be similar to the linear dimension of the nozzle rows of the print head 308. The linear dimensions may refer to the dimensions along the major axis of the particular component, e.g., the vertical axis of the optical imaging sensors 324 as shown in FIG. 3. Having similar dimensions may facilitate the positioning calibration as a component surface image captured by the optical imaging sensors 324 may correspond to deposits from an entire nozzle row of the print head 308.

Figure 4:
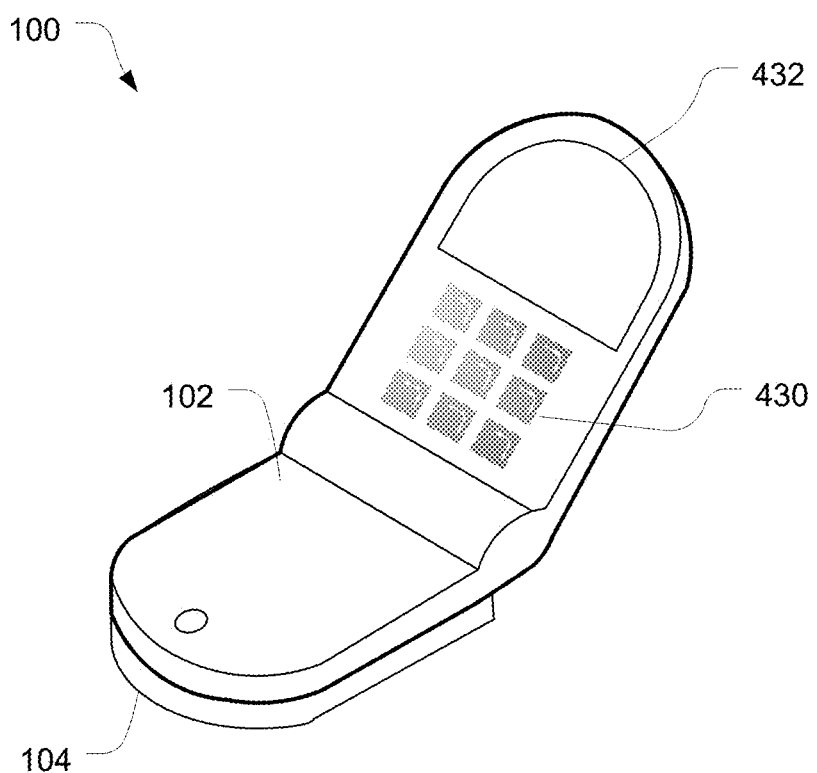
FIG. 4 illustrates a mobile telephone including a printing device in accordance with various embodiments of the present invention.

FIG. 4 illustrates another view of the printing system 100 in accordance with various embodiments of the present invention. As illustrated, the printing device 104 couples to the mobile telephone 102 such that a user may manipulate the printing device 104 by moving the system 100 across a medium. The mobile telephone 102 may include a user interface to allow for inputs/outputs to provide the functionality enabled through use of the printing device 104. Some examples of inputs/outputs that may be used to provide some of the basic functions of the printing device 104 include, but are not limited to, one or more keys 430 or similar features for controlling initiate/resume of a print operation and a display 432.

The display 432, which may be a passive display, an interactive display, etc., may provide the user with a variety of information. The information may relate to the current operating status of the printing device 104 (e.g., printing, ready to print, receiving print image, transmitting print image, etc.), power of the battery, errors (e.g., positioning/printing error, etc.), instructions (e.g., "position device over a printed portion of the image for reorientation," etc.). If the display 432 is an interactive display it may provide a control interface in addition to, or as an alternative from, the keys 430.

Figure 5:
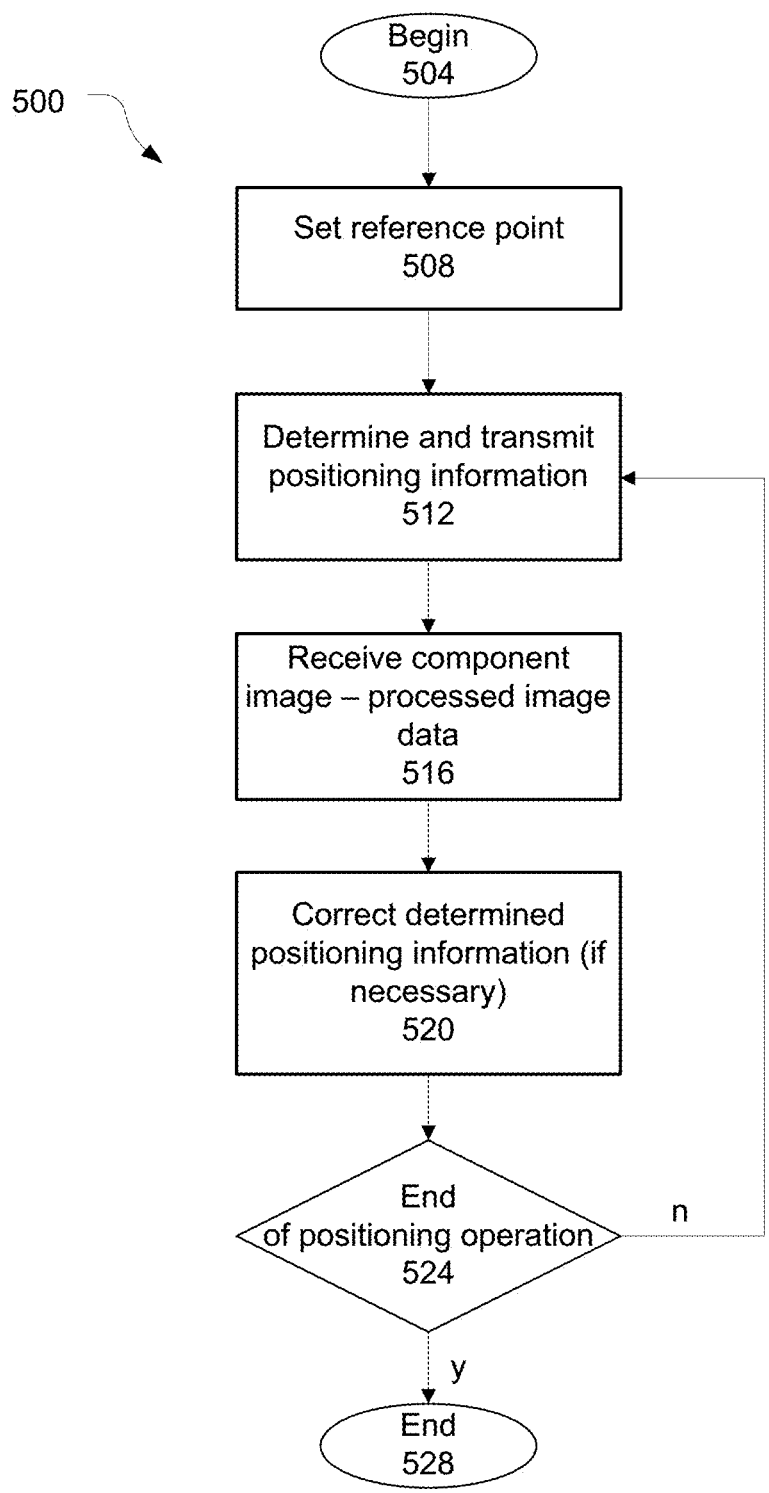
FIG. 5 is a flow diagram depicting a positioning operation of a printing device in accordance with various embodiments of the present invention.

FIG. 5 is a flow diagram 500 depicting a positioning operation of a printing device (such as 104 or 304, for example) or of a mobile telephone (such as 202, for example) in accordance with various embodiments of the present invention. A positioning operation may begin in block 504 with an initiation of a printing operation. A positioning module within the printing device may set a reference point in block 508. The reference point may be set when the printing device is placed onto a medium at the beginning of a print job. This may be ensured by the user entering some input (by way of a user interface 128 or 228, for example) once the printing device is in place and/or by the proper placement of the printing device being treated as a condition precedent to instituting the positioning operation. In some embodiments, the proper placement of the printing device may be automatically determined through the navigation sensors (120, 220, or 320, for example), the optical imaging sensors (124, 224, or 324, for example), and/or some other sensors (e.g., a proximity sensor).

Once the reference point is set in block 508, the positioning module may determine positioning information, e.g., translational and/or rotational changes from the reference point, using the navigation sensors in block 512. Positioning information may be transmitted (to a positioning module, for example). The translational changes may be determined by tracking incremental changes of the positions of the navigation sensors along a two-dimensional coordinate system, e.g., Δx and Δy. Rotational changes may be determined by tracking incremental changes in the angle of the printing device, e.g., AO, with respect to, e.g., the y-axis. These transitional and/or rotational changes may be determined by the positioning module comparing consecutive navigational measurements taken by the navigation sensors to detect these movements.

The positioning module may also receive component surface images from the optical imaging sensors and processed image data from the image processing module in block 516. If the positioning information is accurate, a particular component surface image from a given location should match a corresponding portion of the processed image. If the given location is one in which the print head (108, 208, or 308, for example) has deposited something less than the target print volume for the location, the corresponding portion of the processed image may be adjusted to account for the actual deposited volume for comparison to the component surface image. In the event that the print head has yet to deposit any material in the given location, the positioning information may not be verified through this method. However, the verification of the positioning information may be done frequently enough given the constant movement of the printing device and the physical arrangement of the nozzle rows of the print head in relation to the optical imaging sensors.

If the particular component surface image from the given location does not match the corresponding portion of the processed image the positioning module may correct the determined positioning information in block 520. Given adequate information, e.g., sufficient material deposited in the location captured by the component surface image, the positioning module may set the positioning information to the offset of the portion of the processed image that matches the component surface image. In most cases this may be an identified pattern in close proximity to the location identified by the incorrect positioning information. In the event that the pattern captured by the component surface image does not identify a pattern unique to the region surrounding the incorrect positioning information, multiple component surface images may be combined in an attempt to identify a unique pattern. Alternatively, correction may be postponed until a component surface image is captured that does identify a pattern unique to the surrounding region.

In some embodiments, the correction of the determined positioning information in block 520 may be done periodically in order to avoid overburdening the computational resources of the positioning module.

Following correction in block 520, the positioning module may determine whether the positioning operation is complete in block 524. If it is determined that the positioning operation is not yet complete, the operation may loop back to block 512. If it is determined that it is the end of the positioning operation, the operation may end in block 528. The end of the positioning operation may be tied to the end of the printing operation.

Figure 6:
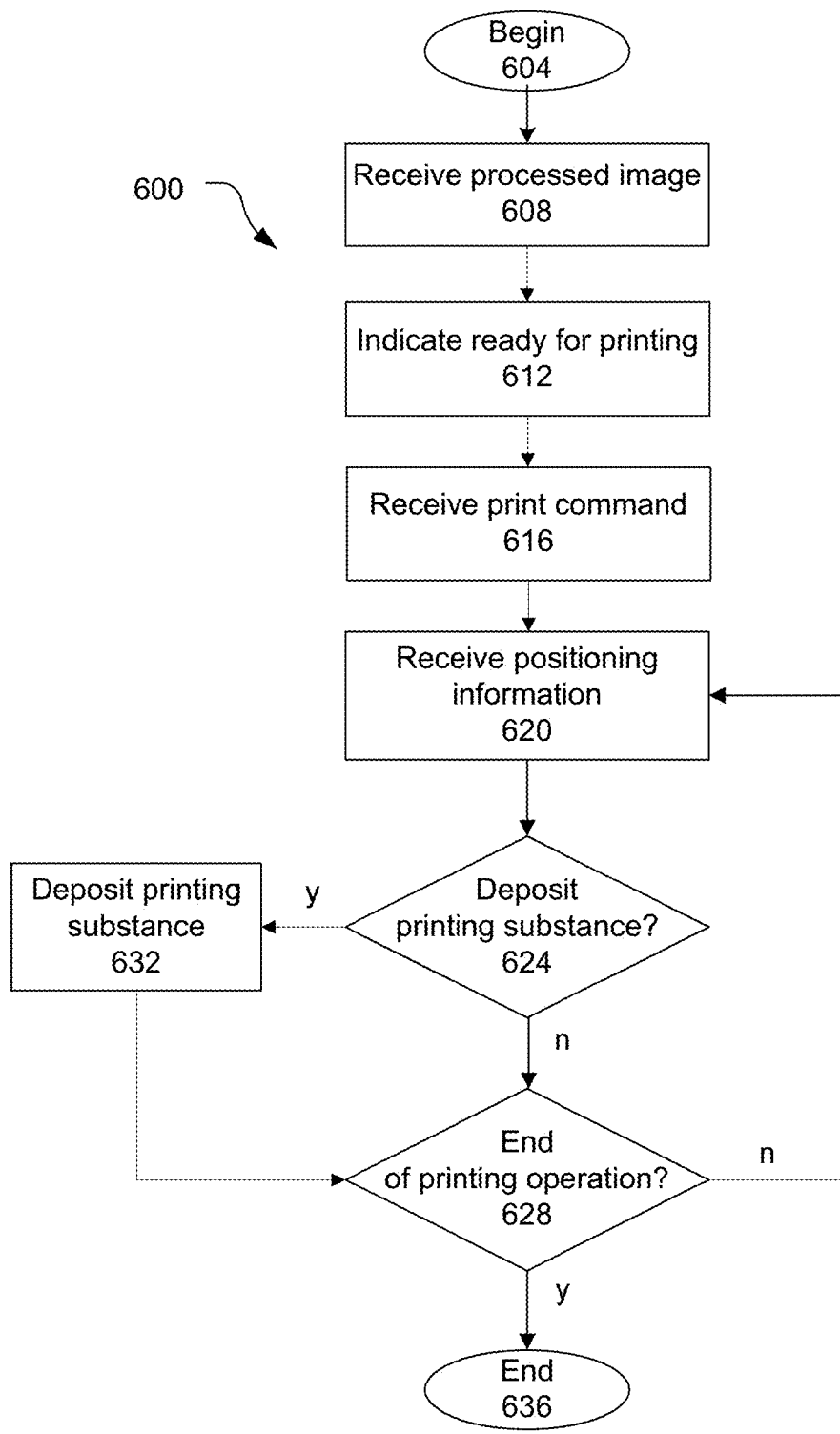
FIG. 6 is a flow diagram depicting a printing operation of a printing device in accordance with various embodiments of the present invention.

FIG. 6 is a flow diagram 600 depicting a printing operation of a printing device (such as 104 or 304, for example) or of a mobile telephone (such as 202, for example) in accordance with various embodiments of the present invention. The printing operation may begin in block 604. The print module may receive a processed image from the image processing module in block 608. Upon receipt of the processed image, the display may indicate that the printing device is ready for printing in block 612.

The print module may receive a print command generated from a user entering some input (by way of a user interface 128 or 228, for example) in block 616. The print module may then receive positioning information from the positioning module in block 620. The print module may then determine whether to deposit printing substance at the given position in block 624. The determination as to whether to deposit printing substance may be a function of the total drop volume for a given location and the amount of volume that has been previously deposited.

If it is determined that no additional printing substance is to be deposited in block 624, the operation may advance to block 628 to determine whether the end of the print operation has been reached. If it is determined that additional printing substance is to be deposited in block 624, the print module may cause an appropriate amount of printing substance to be deposited in block 632 by generating and transmitting control signals to the print head that cause the nozzles to drop the printing substance.

The determination of whether the end of the printing operation has been reached in block 628 may be a function of the printed volume versus the total print volume. In some embodiments the end of the printing operation may be reached even if the printed volume is less than the total print volume. For example, an embodiment may consider the end of the printing operation to occur when the printed volume is ninety-five percent of the total print volume. However, it may be that the distribution of the remaining volume is also considered in the end of print analysis. For example, if the five percent remaining volume is distributed over a relatively small area, the printing operation may not be considered to be completed.

In some embodiments, an end of print job may be established by a user manually canceling the operation.

If, in block 628, it is determined that the printing operation has been completed, the printing operation may conclude in block 636.

If, in block 628, it is determined that the printing operation has not been completed, the printing operation may loop back to block 620.

Figure 7:
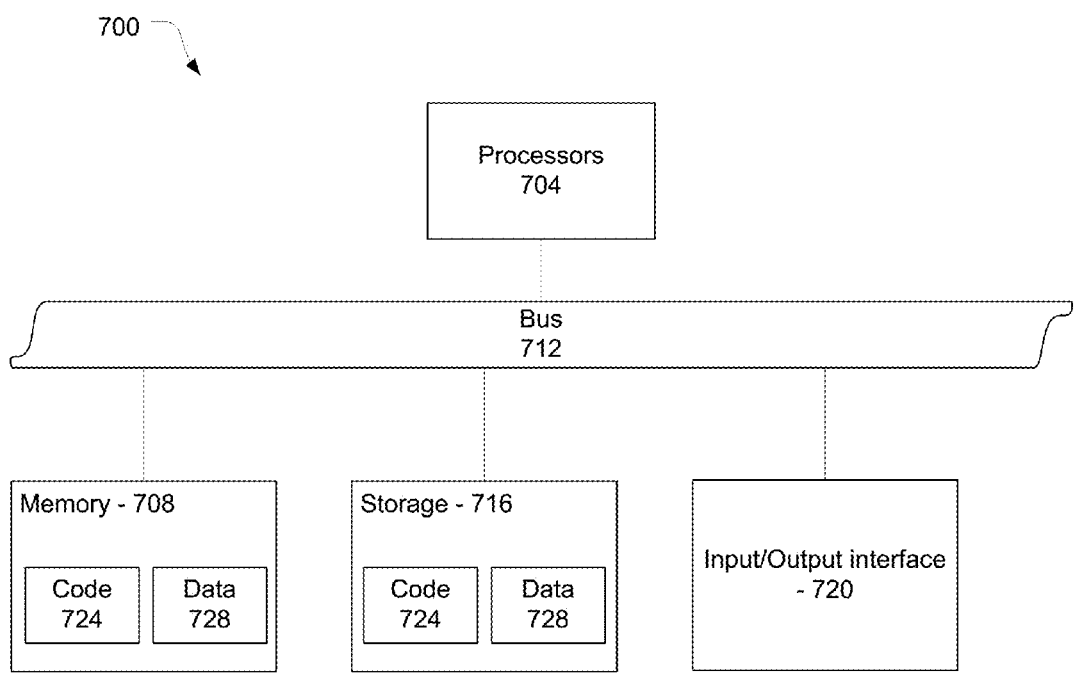
FIG. 7 illustrates a computing device capable of implementing a control block of a printing device in accordance with various embodiments of the present invention.

FIG. 7 illustrates a computing device 700 capable of implementing a control block, e.g., control block 106, in accordance with various embodiments. As illustrated, for the embodiments, computing device 700 includes one or more processors 704, memory 708, and bus 712, coupled to each other as shown. Additionally, computing device 700 includes storage 716, and one or more input/output interfaces 720 coupled to each other, and the earlier described elements as shown. The components of the computing device 700 may be designed to provide the printing and/or positioning functions of a control block of a printing device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of the control block in accordance with embodiments of this invention. The processing data 728 may include data to be acted upon by the instructions of the code 724. In particular, the accessing of the code 724 and data 728 by the processors 704 may facilitate printing and/or positioning operations as described herein.

The processors 704 may include one or more single-core processors, multiple-core processors, controllers, application-specific integrated circuits (ASICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. The storage 716 may be a storage resource physically part of the computing device 700 or it may be accessible by, but not necessarily a part of, the computing device 700. For example, the storage 716 may be accessed by the computing device 700 over a network.

The I/O interfaces 720 may include interfaces designed to communicate with peripheral hardware, e.g., a printing device including one or more of a print head, navigation sensors, optical imaging sensors, etc., and/or other devices, e.g., a mobile telephone.

In various embodiments, computing device 700 may have more or less elements and/or different architectures.

Although specific embodiments have been illustrated and described herein, it will be appreciated by those of ordinary skill in the art and others, that a wide variety of alternate and/or equivalent implementations may be substituted for the specific embodiment shown and described without departing from the scope of the present invention. This application is intended to cover any adaptations or variations of the embodiment discussed herein. Therefore, it is manifested and intended that the invention be limited only by the claims and the equivalents thereof.

What is claimed is:

1. A method for operating a printing apparatus that is attachable to a mobile phone, the method comprising:
   mechanically attaching the printing apparatus to the mobile phone;
   receiving, by the printing apparatus, image data from the mobile phone;
   capturing, by a navigation sensor of the printing apparatus, first navigational measurements of a first portion of a medium while the printing apparatus is placed on the medium, wherein the first navigational measurements of the first portion of the medium comprises one or more images of the first portion of the medium;
   capturing, by an optical imaging sensor of the printing apparatus, a first plurality of surface images of the first portion of the medium while the printing apparatus is placed on the medium;
   based at least in part on the first navigational measurements, determining a position of the printing apparatus relative to a first reference point;
   based on the first plurality of surface images, calibrating the determined position of the printing apparatus relative to the first reference point, wherein calibrating the determined position of the printing apparatus relative to the first reference point further comprises
      based on the first plurality of surface images, constructing a composite image,
      comparing the composite image to at least a portion of the image data, and
      based on comparing the composite image to at least the portion of the image data, calibrating the determined position of the printing apparatus relative to the first reference point;
   while the printing apparatus is mechanically attached to the mobile phone and based on (i) the image data and (ii) the determined position of the printing apparatus as calibrated, depositing, by the printing apparatus, a printing substance on the medium; and
   transmitting, by the printing apparatus to the mobile phone, an operating status associated with the printing apparatus,
   wherein depositing the printing substance on the medium further comprises
      depositing, via a plurality of nozzles of a print head of the printing apparatus, the printing substance on the medium,
   wherein the plurality of nozzles are arranged around the optical imaging sensor.

2. The method of claim 1, wherein mechanically attaching the printing apparatus to the mobile phone further comprises:
   mechanically attaching the printing apparatus to the mobile phone, to enable a user to move the printing apparatus over the medium by moving the attached mobile phone.

3. The method of claim 1, further comprising:
   subsequent to printing the image data on the medium, mechanically detaching the printing apparatus from the mobile phone.

4. The method of claim 1, wherein mechanically attaching the printing apparatus to the mobile phone further comprises:
   mechanically attaching the printing apparatus to the mobile phone by interlocking or snapping the printing apparatus to the mobile phone.

5. The method of claim 1, wherein the operating status associated with printing apparatus comprises one or more of (i) the printing apparatus being ready for printing, (ii) the printing apparatus printing the image data, (iii) the printing apparatus receiving the image data, (iv) a power level of a battery of the printing apparatus, (v) an error message of the printing apparatus, and (vi) an instruction from the printing apparatus.

6. The method of claim 1, wherein transmitting the operating status associated with printing apparatus further comprises:
   transmitting, by the printing apparatus to the mobile phone, the operating status associated with the printing apparatus, to facilitate displaying the operating status associated with printing apparatus on a display of the mobile phone.

7. The method of claim 1, wherein receiving, by the printing apparatus, the image data from the mobile phone further comprises:
   receiving, via a wireless communication interface, the image data from the mobile phone.

8. A printing apparatus comprising:
   a mechanical arrangement configured to mechanically attach the printing apparatus to a mobile phone;
   a communication interface configured to receive image data from the mobile phone;
   a navigation sensor configured to capture first navigational measurements of a first portion of a medium, while the printing apparatus is placed on the medium, wherein the first navigational measurements of the first portion of the medium comprises one or more images of the first portion of the medium;

a plurality of optical imaging sensors, wherein a first optical imaging sensor of the plurality of optical imaging sensors is configured to capture a first plurality of surface images of the first portion of the medium, while the printing apparatus is placed on the medium;

an image capture module configured to, based on the first plurality of surface images, construct a composite image;

a positioning module configured to (i) based on the first navigational measurements, determine a position of the printing apparatus relative to a first reference point, and (ii) compare the composite image to at least a portion of the image data, (iii) based on comparing the composite image to at least the portion of the image data, calibrate the determined position of the printing apparatus relative to the first reference point; and a print head configured to, while the printing apparatus is mechanically attached to the mobile phone and based on (i) the image data and (ii) the determined position of the apparatus as calibrated by the positioning module, deposit a printing substance on the medium, wherein the communication interface is configured to transmit, to the mobile phone, an operating status associated with the printing apparatus, wherein the print head comprises a plurality of nozzles arranged in a nozzle row, and wherein a linear dimension of the nozzle row is substantially equal to a linear dimension of the plurality of optical imaging sensors.

9. The printing apparatus of claim 8, wherein the mechanical arrangement is configured to mechanically attach the printing apparatus to the mobile phone, to enable a user to move the printing apparatus over the medium by moving the attached mobile phone.

10. The printing apparatus of claim 8, wherein the mechanical arrangement is further configured to:
subsequent to the printing apparatus printing the image data on the medium, mechanically detach the printing apparatus from the mobile phone.

11. The printing apparatus of claim 8, wherein the mechanical arrangement is configured to mechanically attach the printing apparatus to the mobile phone by interlocking or snapping the printing apparatus to the mobile phone.

12. The printing apparatus of claim 8, wherein the operating status associated with printing apparatus comprises one or more of (i) the printing apparatus being ready for printing, (ii) the printing apparatus printing the image data, (iii) the printing apparatus receiving the image data, (iv) a power level of a battery of the printing apparatus, (v) an error message of the printing apparatus, and (vi) an instruction from the printing apparatus.

13. The printing apparatus of claim 8, wherein the communication interface is configured to transmit, to the mobile phone, the operating status associated with the printing apparatus, to facilitate displaying the operating status associated with printing apparatus on a display of the mobile phone.

14. The printing apparatus of claim 8, wherein the communication interface is a wireless communication interface.

15. A printing apparatus comprising:
a mechanical arrangement configured to mechanically attach the printing apparatus to a mobile phone;
a communication interface configured to receive image data from the mobile phone;
a navigation sensor configured to capture first navigational measurements of a first portion of a medium, while the printing apparatus is placed on the medium, wherein the first navigational measurements of the first portion of the medium comprises one or more images of the first portion of the medium;
an optical imaging sensor configured to capture a first plurality of surface images of the first portion of the medium, while the printing apparatus is placed on the medium;
an image capture module configured to, based on the first plurality of surface images, construct a composite image;
a positioning module configured to (i) based on the first navigational measurements, determine a position of the printing apparatus relative to a first reference point, and (ii) compare the composite image to at least a portion of the image data, (iii) based on comparing the composite image to at least the portion of the image data, calibrate the determined position of the printing apparatus relative to the first reference point; and
a print head configured to, while the printing apparatus is mechanically attached to the mobile phone and based on (i) the image data and (ii) the determined position of the apparatus as calibrated by the positioning module, deposit a printing substance on the medium,
wherein the communication interface is configured to transmit, to the mobile phone, an operating status associated with the printing apparatus, and
wherein the print head comprises a plurality of nozzles arranged around the optical imaging sensor.

16. A method for operating a printing apparatus that is attachable to a mobile phone, the method comprising:
mechanically attaching the printing apparatus to the mobile phone;
receiving, by the printing apparatus, image data from the mobile phone;
capturing, by a navigation sensor of the printing apparatus, first navigational measurements of a first portion of a medium while the printing apparatus is placed on the medium, wherein the first navigational measurements of the first portion of the medium comprises one or more images of the first portion of the medium;
capturing, by a first optical imaging sensor of a plurality of optical imaging sensors of the printing apparatus, a first plurality of surface images of the first portion of the medium while the printing apparatus is placed on the medium;
based at least in part on the first navigational measurements, determining a position of the printing apparatus relative to a first reference point;
based on the first plurality of surface images, calibrating the determined position of the printing apparatus relative to the first reference point, wherein calibrating the determined position of the printing apparatus relative to the first reference point further comprises
based on the first plurality of surface images, constructing a composite image,
comparing the composite image to at least a portion of the image data, and
based on comparing the composite image to at least the portion of the image data, calibrating the determined position of the printing apparatus relative to the first reference point;
while the printing apparatus is mechanically attached to the mobile phone and based on (i) the image data and (ii) the determined position of the printing apparatus as calibrated, depositing, via a plurality of nozzles of a print head of the printing apparatus, a printing substance on the medium; and transmitting, by the printing apparatus to the mobile phone, an operating status associated with the printing apparatus, wherein the plurality of nozzles are arranged in a nozzle row, and wherein a linear dimension of the nozzle row is substantially equal to a linear dimension of the plurality of optical imaging sensors.

* * * * *